(12) United States Patent
Marrella et al.

(10) Patent No.: US 7,553,476 B2
(45) Date of Patent: Jun. 30, 2009

(54) PROCESS STREAM CONDENSATE RECYCLE METHOD FOR A STEAM REFORMER

(75) Inventors: Vincenzo Salvatore Marrella, Williamsville, NY (US); Alfred Joseph Francis, II, Ellington, CT (US); Gary Wayne Fenner, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 1248 days.

(21) Appl. No.: 10/671,555

(22) Filed: Sep. 29, 2003

(65) Prior Publication Data

US 2005/0288381 A1 Dec. 29, 2005

(51) Int. Cl.
*C01B 3/02* (2006.01)
(52) U.S. Cl. .................................. 423/648.1; 423/651
(58) Field of Classification Search .............. 423/648.1, 423/651
See application file for complete search history.

(56) References Cited

U.S. PATENT DOCUMENTS

| | | | | |
|---|---|---|---|---|
| 3,642,731 A | * | 2/1972 | Tegge et al. | 203/71 |
| 4,193,776 A | * | 3/1980 | Wasala et al. | 95/256 |
| 4,377,066 A | * | 3/1983 | Dickinson | 60/775 |
| 4,464,228 A | * | 8/1984 | Roensch | 203/49 |
| 4,846,240 A | * | 7/1989 | Erickson | 159/24.2 |
| 2003/0110693 A1 | * | 6/2003 | Drnevich et al. | 48/197 R |

FOREIGN PATENT DOCUMENTS

| GB | 2006814 | | 9/1978 |
|---|---|---|---|
| GB | 2006814 | * | 5/1979 |

\* cited by examiner

*Primary Examiner*—Stanley Silverman
*Assistant Examiner*—Paul Wartalowicz
(74) *Attorney, Agent, or Firm*—David M. Rosenblum

(57) ABSTRACT

A method of recycling process stream condensate from a steam reforming system that produces an uncontaminated superheated steam stream and one or more process condensate streams formed of condensate condensed from a water containing product stream that is also produced by the steam reforming system. The process condensate stream is collected and formed into a contaminated condensate stream. The contaminated condensate stream is then pressurized and heated with a first part of the uncontaminated superheated steam stream to form a contaminated superheated steam stream and an uncontaminated condensate stream. A second part of the uncontaminated superheated steam stream is combined with the contaminated superheated steam stream to form a combined superheated steam stream that is used as a source of steam for steam reforming. The uncontaminated condensate stream is recycled as make up for the uncontaminated superheated steam stream. In such manner, contaminated process condensate is reused and uncontaminated steam is available for export.

8 Claims, 2 Drawing Sheets

PROCESS STREAM CONDENSATE RECYCLE METHOD FOR A STEAM REFORMER

FIELD OF THE INVENTION

The present invention relates to a method of recycling a process stream condensate from a steam reformer in which the process stream condensate is formed by condensing water from a water containing product stream of the steam reformer against raising superheated steam. More particularly, the present invention relates to such a method in which the process stream condensate is vaporized and superheated through heat transfer with the superheated steam and is then combined with a hydrocarbon stream for use as a feed to the steam reformer.

BACKGROUND OF THE INVENTION

There are a variety of steam reforming processes such as steam methane reformers for production of syngas, steam reforming of lighter hydrocarbons, and steam reforming of lighter hydrocarbons to make hydrogen. In all of such steam reforming processes, a condensate, that is condensed from the product stream of the steam reformer, can be contaminated by a variety of compounds. This contamination can prevent exportation of steam made up of such condensate to customers that cannot tolerate such contaminants. Additionally, the condensate cannot be discharged as waste water without additional treatment.

For instance, in a typical steam methane reformer, natural gas consisting mostly of methane is reacted with excess steam at high temperature to produce a gas stream rich in hydrogen and carbon monoxide that is commonly referred to as syngas. The gas stream may be further processed to reduce the amount of carbon monoxide, thereby to produce more hydrogen. In the course of the process, the process gas, syngas, or hydrogen-rich gas, is cooled and excess steam is condensed out of the process gas. The resulting condensate, mostly water, is recovered and re-used to make steam by recovering heat in the steam methane reformer steam generating system. Steam is also produced from heat recovered when the combustion gas generated to heat the reformer is cooled to near ambient temperatures. Part of the steam from the steam methane reformer steam generating system may be exported and the remainder, referred to as process steam, is mixed with natural gas to produce syngas in the steam methane reformer. Typically, contaminants from the process condensate that end up in the export steam and the process steam include such compounds as carbon dioxide, methanol, ammonia, formic and acetic acid.

There have been a variety of prior art treatment schemes that have had as their aim the reuse of the contaminated process stream condensate. For instance, in United Kingdom Patent Application, GB 2006814A, water is condensed and separated from an intermediate syngas product. The resulting process condensate stream is pumped and heated with part of the superheated steam produced by a steam methane reformer to produce a heated water stream. The heated water stream is recirculated by a recirculation pump to a contacting column that is used to saturate an incoming hydrocarbon containing feed. The saturated hydrocarbon containing feed is combined with a remaining part of the make up steam and introduced into the steam methane reformer. In such manner, process condensate that contains contaminants is recycled.

In U.S. Pat. No. 4,193,776, a process stream condensate from a steam methane reformer is purified by stripping it with an incoming hydrocarbon containing feed stream before the use of such feed stream in the steam methane reformer. The purified process condensate is cooled and subjected to further purification, and used as makeup for the steam. The tower overhead is combined with the incoming hydrocarbon containing stream to be reformed.

The foregoing patents all involve some degree of expensive modification involving the provision of additional contacting columns, stripping columns and water treatment devices. As will become apparent, the present invention provides a process stream condensate recycle method that can be effectuated in a far less expensive manner than the prior art and that has special applicability as a retrofit to an existing plant.

SUMMARY OF THE INVENTION

The present invention provides a method of recycling process stream condensate from a steam reforming system that produces an uncontaminated superheated steam stream and at least one process condensate stream. The at least one process condensate stream is contaminated with products of a steam reformer of the steam reforming system.

In accordance with the method, the condensate from at least one process condensate stream is collected and formed into a contaminated condensate stream. The contaminated condensate stream is pressurized and heat is transferred from a first part of the uncontaminated superheated steam stream to the contaminated condensate stream, after having been pressurized, to form a contaminated superheated steam stream. The heat transfer also condenses the first part of the uncontaminated superheated steam stream, thereby to form an uncontaminated condensate stream. A second part of the uncontaminated superheated steam stream is combined with the contaminated superheated steam stream to form a combined superheated steam stream. The uncontaminated condensate stream is recycled to the steam reforming system as make up for the uncontaminated superheated steam stream. At least part of the combined superheated steam stream is used to form a hydrocarbon and steam containing process stream that is used as a feed to the steam reformer. In such manner, contaminated process condensate is recycled for use in steam reforming and uncontaminated steam is available for export.

It is to be noted that the use of the term "uncontaminated" with respect to a water or steam stream as used herein and in the claims means that such stream does not contain contaminants of the reforming process.

As can be appreciated from the above description of the present invention, the streams produced by the steam reformer are externally processed for reuse, recycling and export by heat exchange alone and as such an apparatus to carry out a method in accordance with the present invention effectuated without any change to the steam reforming process itself and in a manner that can be far less expensive than the prior art. Dissolved gases can be stripped out of the at least one process condensate stream in a stripping column. The condensate can then be collected as column bottoms of the stripping column. The process condensate can be collected in a collection drum. Heat can be transferred from the first part of the uncontaminated superheated steam stream to the contaminated condensate stream, in sequence, in a process steam superheater, a boiler, and a condensate preheater so that the contaminated condensate stream is initially preheated in the preheater, is boiled in the boiler, and is then superheated in the process steam superheater. Alternatively, the heat can be transferred from the first part of the uncontaminated superheated steam stream to the contaminated condensate stream in a single plate and frame heat exchanger.

A third part of the uncontaminated superheated steam stream can be exported because it has not been contaminated with impurities of the reforming process. Additionally, condensate from an external process condensate stream produced externally to the steam reformer can be collected. In such case, the contaminated condensate stream is formed by such external process condensate stream and the at least one process condensate stream.

BRIEF DESCRIPTION OF THE DRAWINGS

While the specifications concludes with claims distinctly pointing out the subject matter that applicants regard as their invention, it is believed that the invention will be better understood when taken in connection with the accompanying drawings in which:

DETAILED DESCRIPTION

Figure 1:
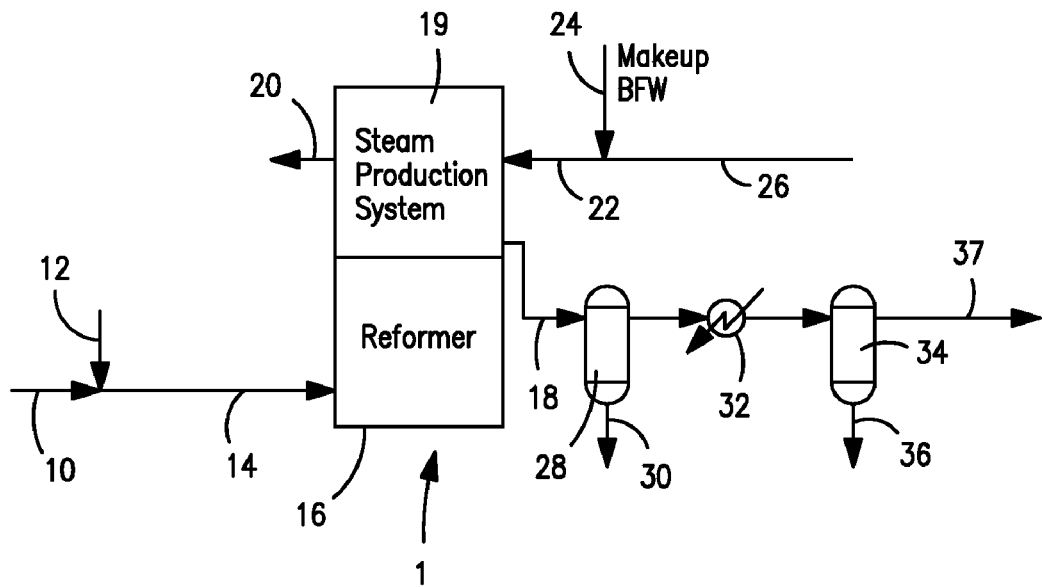
FIG. 1 is a schematic diagram of a steam reformer that produces an uncontaminated superheated steam stream, an intermediate product, and process condensate.

With reference to FIG. 1 a steam methane reforming system 1 is illustrated. It is to be noted that although the present invention will be discussed in connection with steam methane reforming it is equally applicable to other steam reforming processes.

A hydrocarbon containing stream 10 is combined with a combined superheated steam stream 12 formed of superheated steam to form a hydrocarbon and steam containing process stream 14. The hydrocarbon and steam containing process stream 14 is used as a feed to a steam methane reformer 16 which produces an intermediate, water containing product stream 18 that emerges from a steam production system 19.

Steam production system 19 produces an uncontaminated superheated steam stream 20. In this regard, steam generation system 19 consists of known heat exchangers in the convective section of the steam methane reformer 16 as well as external heat exchangers in which combustion gases from the reformer as well as the intermediate water containing process stream 18 transfers heat to a combined water stream 22 consisting of makeup boiler feed water stream 24 and an uncontaminated condensate stream 26 which will be discussed hereinafter. The aforesaid heat transfer converts combined water stream 22 into uncontaminated superheated steam stream 20 and at least partially condenses the water in the water containing process stream 18.

Water containing process stream 18 is thereafter introduced into a first separator drum 28 to produce a hot process condensate stream 30. Thereafter, water containing process stream 18 is further cooled by a cooling stage 32 and introduced into second separator drum 34 to produce a cold process condensate stream 36 and an intermediate product stream 37 that can be further processed by such means as a pressure swing adsorption unit to produce a hydrogen product.

It is important to note that there are many different steam methane reforming systems and it is not the intent herein that the invention as subsequently claimed is limited to any particular reformer design, let alone steam methane reforming in particular. For instance, there are steam methane reforming systems in which only a single process condensate stream is produced.

Figure 2:
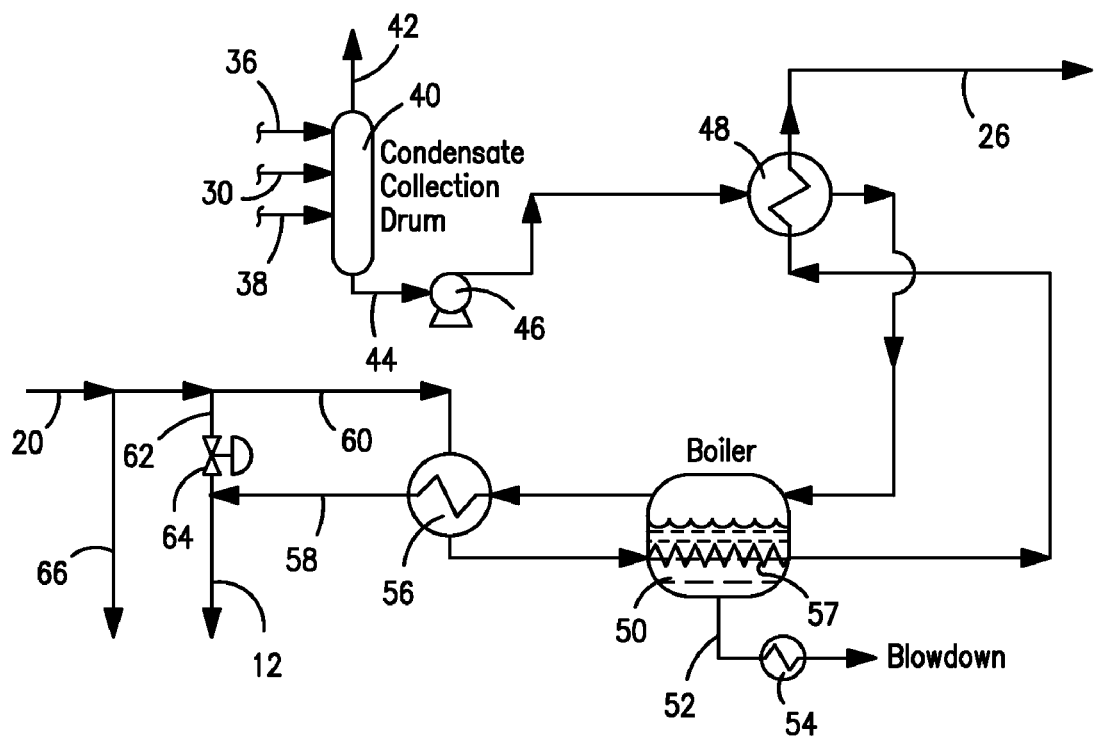
FIG. 2 is a schematic diagram of an apparatus for carrying out a method in accordance with the present invention.

With reference to FIG. 2, condensate is collected from cold process condensate stream 36, hot process condensate stream 30, and optionally, an external process condensate stream 38, within a condensation collection drum 40. In this regard external process condensate stream 38 can be from a process that is external and conducted along side of the steam methane reforming process. A vapor stream 42 may be created when aforesaid streams enter into condensate collection drum. Such vapor stream 42, depending upon its content, may be vented to atmosphere or flared off. A contaminated condensate stream 44 is formed by the collection of condensate. Contaminated condensate stream 44 is contaminated with products of the steam methane reforming, for instance, carbon dioxide, methanol, ammonia, formic and acetic acids since it is derived from water containing process stream 18 which contains such products from the steam methane reforming.

Contaminated condensate stream 44 is pressurized by a pump 46 to a pressure slightly above the pressure of the steam methane reforming process, typically between about 300 and about 500 psig. Where export steam is required at high pressures, the degree of pressurization may be increased by appropriate selection of pump 46. It is to be noted that since hot condensate stream 30 and cold condensate stream 36 may enter condensate collection drum 40 at pressure, which may be between about 250 psig and about 350 psig, such pressure is recovered in contaminated condensate stream 44. As such the number of stages required in pump 46 is less than would otherwise be required had such pressure not been recovered resulting in a cost savings associated with the cost of pump 46.

Contaminated condensate stream 44 is then preheated in condensate preheater 48 and boiled within a boiler 50. A blowdown stream 52 can be discharged and if necessary cooled within a blowdown cooler 54 prior to discharge. Contaminated condensate stream 44 is thereafter fully heated in a process stream superheater 56 to form a contaminated superheated steam stream 58.

A first part 60 of the uncontaminated superheated steam stream 20 produced in the steam production system 19 of steam methane reformer 16 is introduced into process steam superheater 56, a heat exchanger 57 within boiler 50 to boil contaminated condensate stream 44, and then passed through condensate preheater 48. As a result, an uncontaminated condensate stream 26 is formed that is recycled to the steam production system 19 of steam methane reformer system 1 described above.

A second part 62 of uncontaminated superheated steam stream 20 may be pressure reduced in a pressure reduction valve 64 and combined with contaminated superheated steam stream 58 to form combined superheated steam stream 12 in order to replace steam consumed in the steam reforming process. The steam content of the hydrocarbon and steam containing stream 14 can be augmented with further steam in which case only part of the steam content of the hydrocarbon and steam containing stream 14 is formed from combined superheated steam stream 12. Additionally, part of the combined superheated steam stream 12 can be exported to another process that does not require uncontaminated steam. Also, a third part 66 of uncontaminated superheated steam stream 20 can also be exported.

Figure 3:
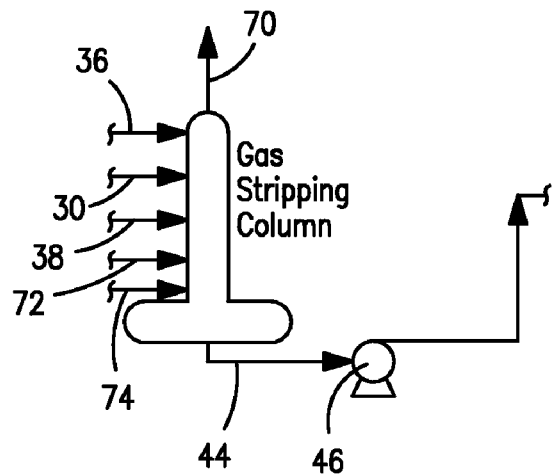
FIG. 3 is a fragmentary view of an alternative embodiment of the apparatus illustrated in FIG. 2 in which a stripping column is substituted for a collection drum.

With reference to FIG. 3, cold process condensate stream 36, hot process condensate stream 30 and external process condensate stream 38 can be introduced into a gas stripping column 68 having either trays or packing to be stripped of gases which can be vented to the atmosphere as a stream 70. A stripping steam stream 72 is introduced into the base of gas stripping column 68 together with a water chemical treatment stream 74 to produce an ascending vapor phase becoming ever more lean in liquid water. The descending liquid phase of liquid water collects as column bottoms which is used to form the contaminated condensate stream 44 therefrom. Contaminated condensate stream 44 is then processed in an identical manner to that illustrated in FIG. 2.

The advantage of the foregoing embodiment is that the condensate may contain carbon dioxide that is stripped from the condensate in stripping column 68. The presence of carbon dioxide would require the use of special materials such as stainless steel and the like for fabricating the components of the embodiment of FIG. 2. The use of stripping column 68 and the introduction of such water treatment chemicals such as phosphate based polymers and amines to prevent scaling and corrosion produce a contaminated condensate stream 44 suitable for boiler service and therefore the use of less expensive materials such as carbon steel. Stripping column 68, however, operates at a low pressure, typically about 5 psig to about 10 psig. Thus, pump 46 would require more stages than pump 46 of FIG. 2 and would therefore be more expensive.

Figure 4:
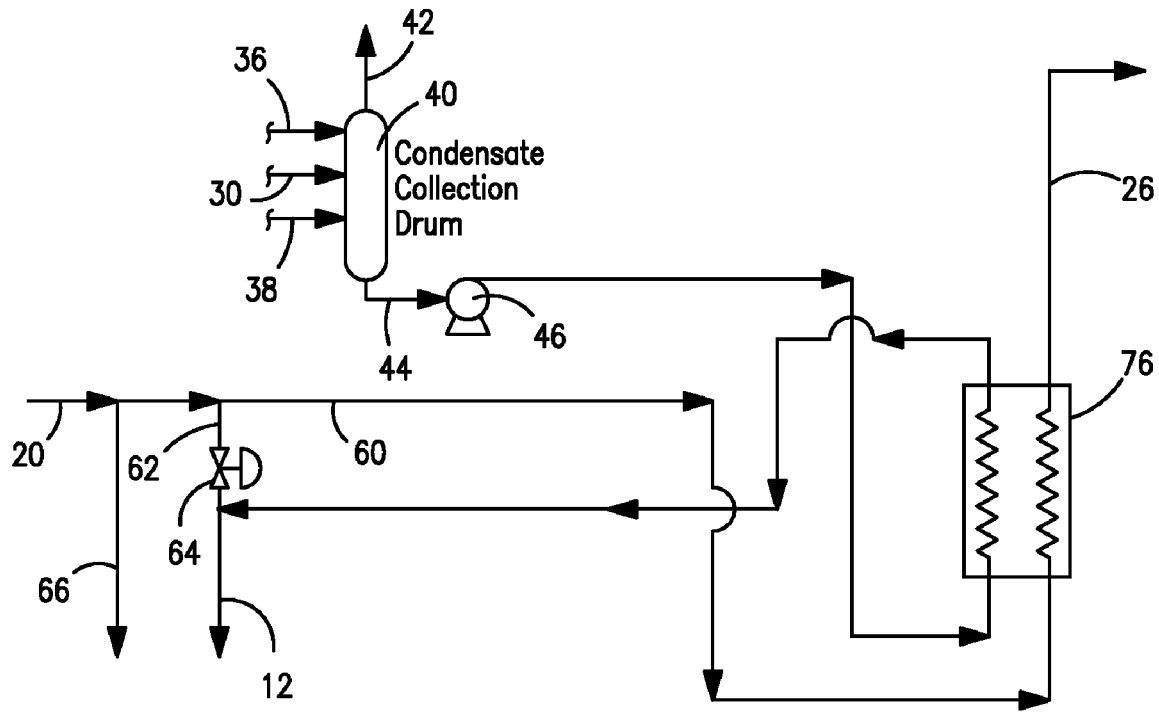
FIG. 4 is yet another alternative embodiment of the apparatus illustrated in FIG. 2 for carrying out a method in accordance with the present invention.

With reference to FIG. 4, in place of condensate preheater 48, boiler 50 and process steam superheater 52, a process steam boiler 76 can be provided that is formed of a plate and frame heat exchanger. In all other respects, the processing of the streams can be identical to that shown in FIG. 2. The advantage of this embodiment is that plate and frame heat exchangers offer high heat transfer rates that result in a compact design that is less costly to produce and install over traditional shell and tube style heat exchangers. Cost savings can be realized in such embodiment in that the one plate and frame heat exchanger replaces the heat exchangers and boiler of FIG. 2.

While the present invention has been described with reference to preferred embodiment, as will occur to those skilled in the art, numerous changes, omissions and additions can be made without departing from the spirit and scope of the present invention.

What is claimed:

1. A method of recycling process stream condensate from a steam reforming system that produces an uncontaminated superheated steam stream and at least one process condensate stream contaminated with products of a steam reformer of the steam reforming system, said method comprising:

collecting condensate from the at least one process condensate stream and forming a contaminated condensate stream therefrom;

pressurizing the contaminated condensate stream;

transferring heat from a first part of the uncontaminated superheated steam stream to the contaminated condensate stream, after having been pressurized, to form a contaminated superheated steam stream and to condense the first part of the uncontaminated superheated steam stream, thereby to form an uncontaminated condensate stream;

combining a second part of the uncontaminated superheated steam stream with the contaminated superheated steam stream to form a combined superheated steam stream;

recycling the uncontaminated condensate stream to the steam reforming system as make up for the uncontaminated superheated steam stream; and combining at least part of the combined superheated steam stream with a hydrocarbon containing stream to form a hydrocarbon steam containing process stream as a feed to the steam reformer.

2. The method of claim 1, further comprising stripping dissolved gases out of the at least one process condensate stream in a stripping column and collecting the condensate as a column bottoms of the stripping column.

3. The method of claim 1, wherein the process condensate is collected in a collection drum.

4. The method of claim 2 or claim 3, wherein heat is transferred from the first part of the uncontaminated superheated steam stream to the contaminated condensate stream, in sequence, in a process steam superheater, a boiler, and a condensate preheater so that the contaminated condensate stream is initially preheated in the condensate preheater, is boiled in the boiler, and is then superheated in the process steam superheater.

5. The method of claim 2 or claim 3, wherein heat is transferred from the first part of the uncontaminated superheated steam stream to the contaminated condensate stream in a single plate and frame heat exchanger.

6. The method of claim 4, wherein a third part of the uncontaminated superheated steam stream is exported.

7. The method of claim 5, wherein a third part of the uncontaminated superheated steam stream is exported.

8. The method of claim 1, further comprising collecting condensate from an external process condensate stream produced externally to the steam reformer and forming the contaminated condensate stream from the external process condensate stream and the at least one processes condensate stream.

* * * * *